(12) United States Patent
Moore

(10) Patent No.: US 8,875,853 B2
(45) Date of Patent: Nov. 4, 2014

(54) HYDRAULIC BRAKE DEVICE

(71) Applicant: Wayne-Ian Moore, Changhua County (TW)

(72) Inventor: Wayne-Ian Moore, Changhua County (TW)

(73) Assignee: Ashima Ltd., Changhua County (TW)

( * ) Notice: Subject to any disclaimer, the term of this patent is extended or adjusted under 35 U.S.C. 154(b) by 89 days.

(21) Appl. No.: 13/740,243

(22) Filed: Jan. 13, 2013

(65) Prior Publication Data

US 2013/0284552 A1  Oct. 31, 2013

(30) Foreign Application Priority Data

Apr. 25, 2012 (TW) .............. 101114772 A

(51) Int. Cl.
*B62L 5/20* (2006.01)
*B62L 3/02* (2006.01)
*B62K 23/06* (2006.01)
*B60T 11/16* (2006.01)
*B60T 7/10* (2006.01)
*B60T 11/18* (2006.01)

(52) U.S. Cl.
CPC .............. *B62L 3/023* (2013.01); *B62K 23/06* (2013.01); *B60T 11/16* (2013.01); *B60T 7/102* (2013.01); *B60T 11/18* (2013.01)
USPC ....................................... 188/344; 188/24.15

(58) Field of Classification Search
CPC .............. B62L 3/00; B62L 3/02; B62L 3/023
USPC ......... 188/24.15, 24.22, 344; 303/87; 60/591, 60/594; 92/85 A, 85 B
See application file for complete search history.

(56) References Cited

U.S. PATENT DOCUMENTS

| | | | | |
|---|---|---|---|---|
| 2,741,896 A * | 4/1956 | Geiger | ...................... | 60/587 |
| 3,803,988 A * | 4/1974 | Orr | ...................... | 92/85 R |
| 7,380,646 B1 * | 6/2008 | Takachi | ...................... | 188/344 |
| 7,654,366 B2 * | 2/2010 | Matsushita | ............... | 188/24.22 |
| 7,857,112 B1 * | 12/2010 | Tsai et al. | ..................... | 188/344 |
| 7,963,114 B2 * | 6/2011 | Moore | ...................... | 60/594 |
| 2012/0152673 A1 * | 6/2012 | Wang | ...................... | 188/344 |
| 2013/0025988 A1 * | 1/2013 | Moore | ...................... | 188/344 |

* cited by examiner

*Primary Examiner* — Bradley King
*Assistant Examiner* — Nicholas J Lane

(57) ABSTRACT

A hydraulic brake device includes a main body, a brake lever, a hydraulic rod, a connecting rod, a sleeve member and an elastic member. The elastic member has an assembling portion, a driving portion and a deformation portion. When a user actuates the brake lever suddenly and forcefully, the driving portion of the elastic member moves toward the hydraulic room; a pressure of hydraulic oil pushes the driving portion so as to indirectly force the deformation portion to deform and bend, so that the deformation portion and the driving portion slightly move toward the assembling portion; thereby, a volume of hydraulic oil is smoothly pushed into a brake caliper through a hydraulic pipeline, such that the user brakes a bicycle stably, smoothly and safely.

7 Claims, 5 Drawing Sheets

HYDRAULIC BRAKE DEVICE

BACKGROUND OF THE INVENTION

1. Field of the Invention

The present invention relates to a brake device, and more particularly to a hydraulic brake device for a bicycle.

2. Description of Related Art

A conventional hydraulic brake device comprises a brake lever defined on a handle bar of a bicycle, a brake caliper being adjacent to a wheel of the bicycle, an oil pipe connecting the brake lever and the brake caliper so as to deliver a volume of hydraulic oil, the brake lever having a first piston assembly defined therein, the brake caliper having a second piston assembly, a brake pad and a disc plate defined therein. Under this arrangement, when a user actuates the brake lever so as to drive the first piston assembly to compress the hydraulic oil, the hydraulic oil is pushed to the brake caliper through the oil pipe, and the compression of the hydraulic oil drives the second piston assembly of the brake caliper so as to actuate the brake pad to clamp the disc plate for braking the bicycle.

However, the conventional hydraulic brake device has a disadvantage as following.

When the user actuates the brake lever of the conventional hydraulic brake device too hard, a front wheel and a rear wheel of the bicycle will be locked at the moment right after the brake lever is actuated; thereby, a center of gravity of the user is shifted because of the inertia principle, so that the user cannot control the bicycle stably; as a result, a bike accident possibly occurs.

The present invention has arisen to mitigate and/or obviate the disadvantages of the conventional.

SUMMARY OF THE INVENTION

The main objective of the present invention is to provide a hydraulic brake device.

To achieve the objective, a hydraulic brake device comprises a main body, a brake lever, a hydraulic rod, a connecting rod, a sleeve member and an elastic member, the main body having a hydraulic room and an assembling room, where the assembling room adjoins the hydraulic room structurally, is disposed at one end of the main body and adjoins an outside structurally, at which the hydraulic rod is inserted in the main body, one end of the brake lever pivotally assembled to the main body, the brake lever corresponding to the outside of the assembling room, the hydraulic rod movably assembled in the hydraulic room and the assembling room, the hydraulic rod having an operating head, an assembling head, a first sealing segment and a second sealing segment, the operating head being positioned in the hydraulic room, the assembling head being positioned at the outside of the assembling room, one end of the first sealing segment connected to the assembling head, another end of the first sealing segment connected to one end of the second sealing segment, another end of the second sealing segment connected to the operating head, the first sealing segment being positioned in the assembling room and having at least one sealing ring sleeved thereon, the second sealing segment being positioned in the hydraulic room and having at least one elastic ring sleeved thereon, the elastic ring contacting a wall of the hydraulic room, two ends of the connecting rod connecting to the brake lever and the assembling head of the hydraulic rod respectively, the sleeve member slidably assembled in the assembling room and sleeving onto the first sealing segment, the sealing ring contacting an inner wall of the sleeve member, the elastic member having an assembling portion, a driving portion and a deformation portion, the elastic member being defined on the operating head, the deformation portion connecting the assembling portion and the driving portion. Wherein, the operating head has a recess opened at one end thereof; the assembling portion of the elastic member is semispherical shaped and is assembled into the recess; a bead is disposed between a surface of the recess and the assembling portion; the deformation portion of the elastic member is arced; the driving portion is hollow and is positioned within the recess; the driving portion has a flange annularly defined at a periphery of one end thereof; the flange is defined beside an outer periphery of an opening of the recess; one elastic ring is sleevingly positioned between the operating head and the second sealing segment; another elastic ring is sleevingly positioned between the first sealing segment and the second sealing segment; one elastic ring has one annular groove opened thereon and corresponds to one end of the hydraulic room; another elastic ring has another annular groove opened thereon and corresponds to the assembling room; a cap sleeves on a joint between the assembling head and the connecting rod; the sleeve member has a rib defined at a periphery thereof; the assembling room has a limiting member assembled thereon; the limiting member abuts against the rib so that the sleeve member does not detach from the assembling room outwardly.

Under this arrangement, when a user actuates the brake lever to brake a bicycle, the brake lever pushes the hydraulic rod via the connecting rod to move toward another end of the main body, so that the elastic member presses a volume of hydraulic oil into the hydraulic room; when the pressure of the hydraulic oil exceeds a threshold pressure, said pressure of the hydraulic oil pushes the driving portion of the elastic member so as to indirectly force the deformation portion to deform and bend, so that the deformation portion and the driving portion slightly move toward the assembling portion, where the deformation portion deforms to stably and smoothly brake the bicycle; when the user releases the brake lever, the pressure of the hydraulic oil decreases so that the deformation portion of the elastic member recovers elastically and the driving portion returns to its position.

Further benefits and advantages of the present invention will become apparent after a careful reading of the detailed description with appropriate reference to the accompanying drawings.

DETAILED DESCRIPTION OF THE INVENTION

Figure 1:
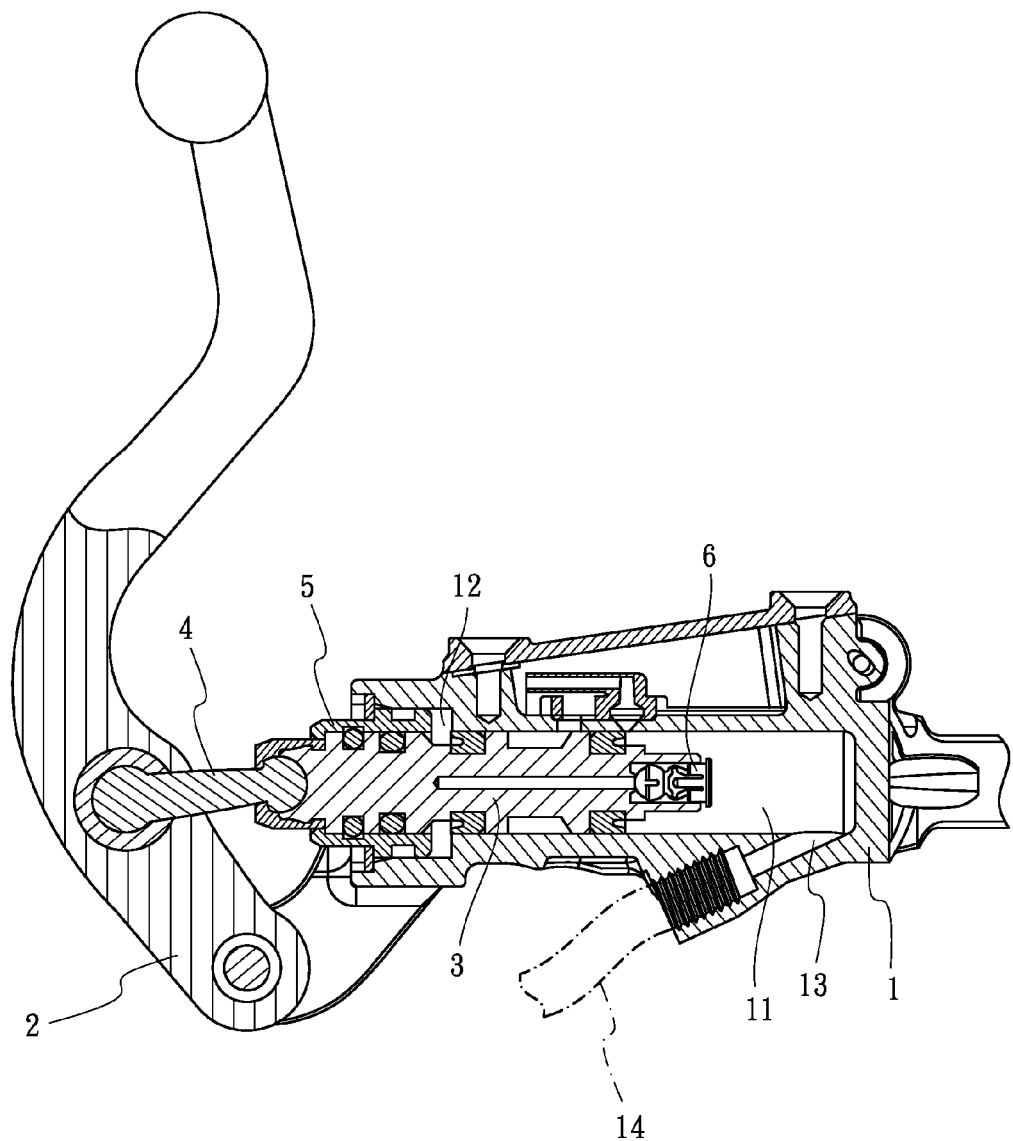
FIG. 1 is a cross-sectional view of a hydraulic brake device of the present invention.

Referring to FIGS. 1-4, a hydraulic brake device in accordance with the present invention comprises a main body 1, a brake lever 2, a hydraulic rod 3, a connecting rod 4, a sleeve member 5 and an elastic member 6.

The main body 1 has s a hydraulic room 11 and an assembling room 12. The assembling room 12 adjoins the hydraulic room 11 structurally. The assembling room 12 is disposed at one end of the main body 1 and adjoins an outside structurally. The hydraulic room 11 has a side void 13 opened thereon. A hydraulic pipeline 14 connects the side void 13 and a brake caliper (not shown).

One end of the brake lever 2 is pivotally assembled to the main body 1. The brake lever 2 corresponds to the outside of the assembling room 12.

The hydraulic rod 3 is movably assembled in the hydraulic room 11 and the assembling room 12. The hydraulic rod 3 has an operating head 31, an assembling head 32, a first sealing segment 33 and a second sealing segment 34. The operating head 31 is positioned in the hydraulic room 11. The assembling head 32 is positioned at the outside of the assembling room 12. One end of the first sealing segment 33 is connected to the assembling head 32. Another end of the first sealing segment 33 is connected to one end of the second sealing segment 34. Another end of the second sealing segment 34 is connected to the operating head 31. The first sealing segment 33 is positioned in the assembling room 12 and having at least one sealing ring 35 sleeved thereon. The second sealing segment 34 is positioned in the hydraulic room 11 and having at least one elastic ring 36 sleeved thereon. The elastic ring 36 contacts a wall of the hydraulic room 11.

Two ends of the connecting rod 4 connect to the brake lever 2 and the assembling head 32 of the hydraulic rod 3 respectively.

The sleeve member 5 is slidably assembled in the assembling room 12 and sleeves onto the first sealing segment 33. The sealing ring 35 contacts an inner wall of the sleeve member 5.

The elastic member 6 has an assembling portion 61, a driving portion 62 and a deformation portion 63. The elastic member 6 is defined on the operating head 31. The deformation portion 63 connects the assembling portion 61 and the driving portion 62.

Figure 2:
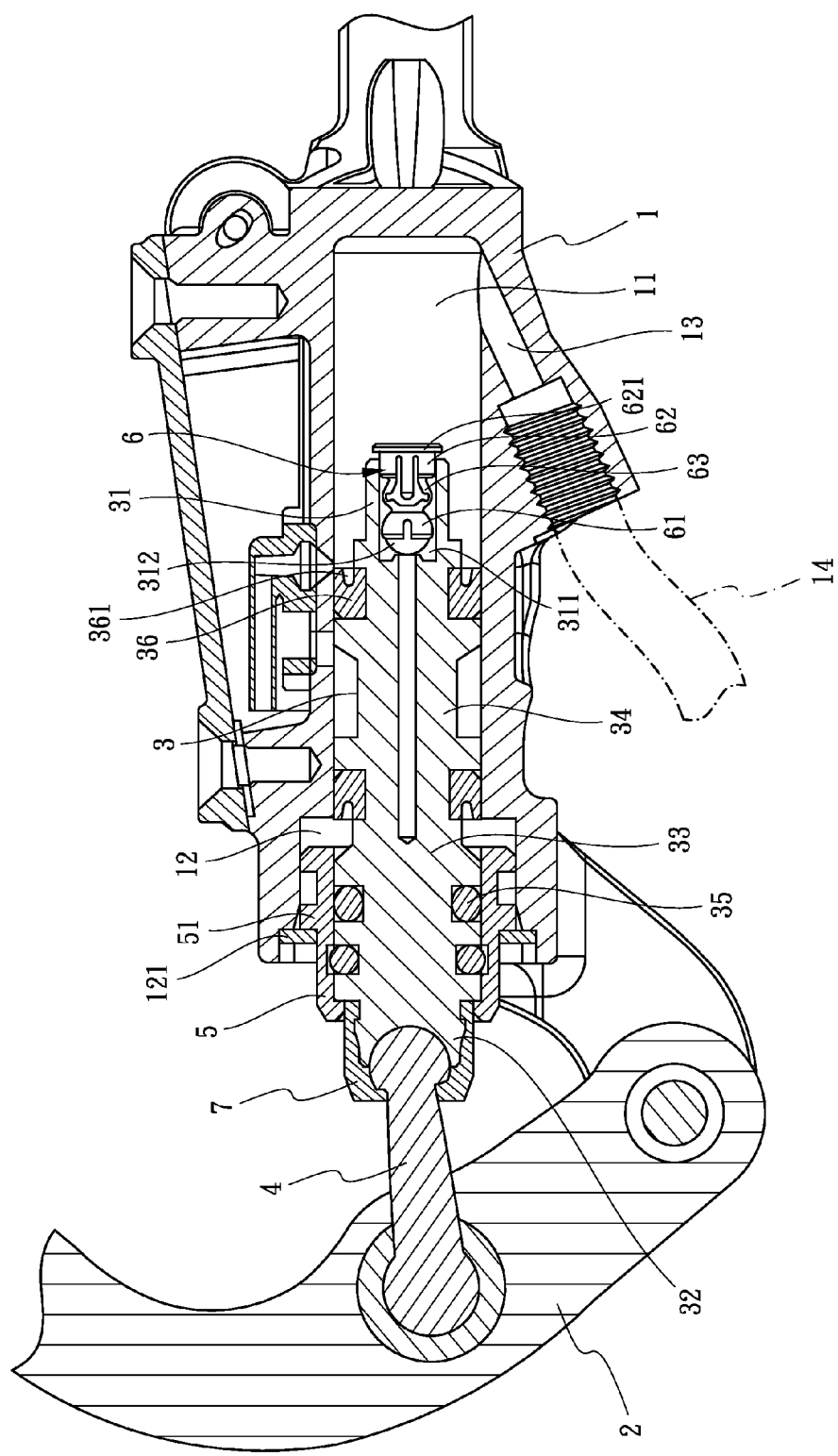
FIG. 2 is a partially cross-sectional view of the hydraulic brake device.
Figure 3:
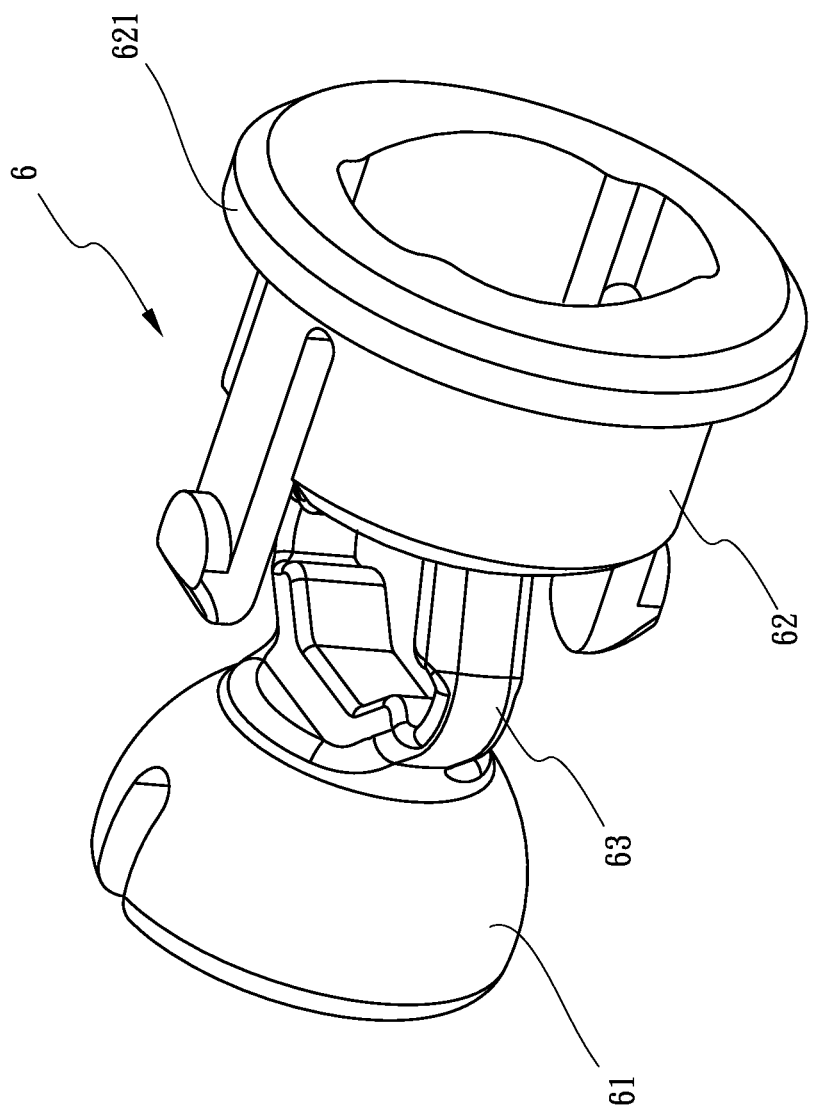
FIG. 3 is a perspective view for showing an elastic member of the hydraulic brake device.
Figure 4:
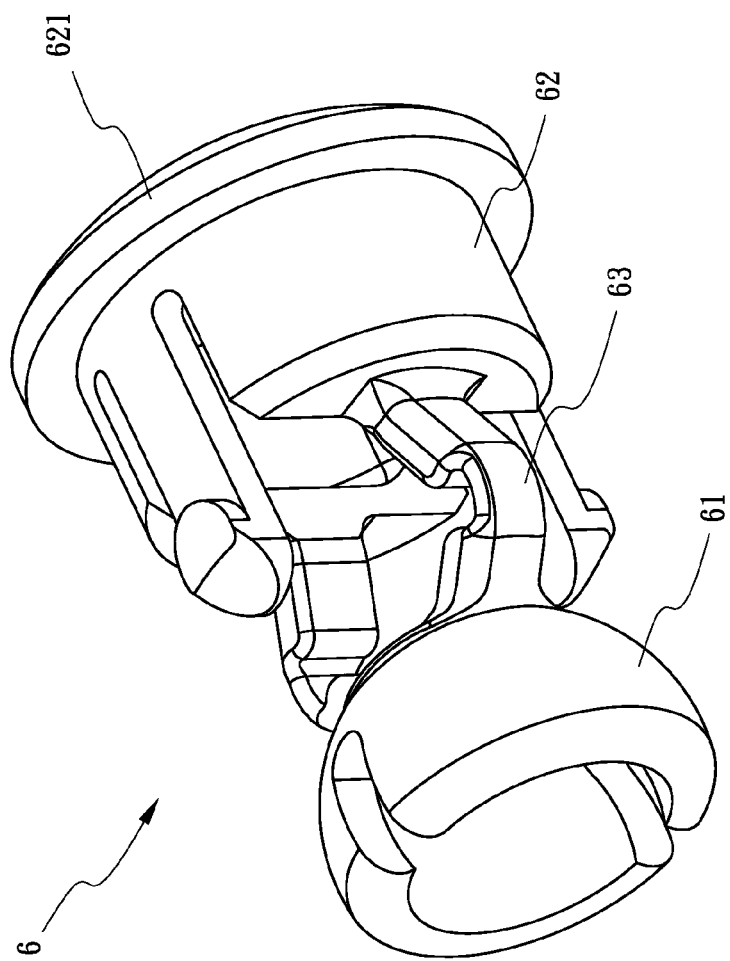
FIG. 4 is another perspective view for showing the elastic member of the hydraulic brake device.
Figure 5:
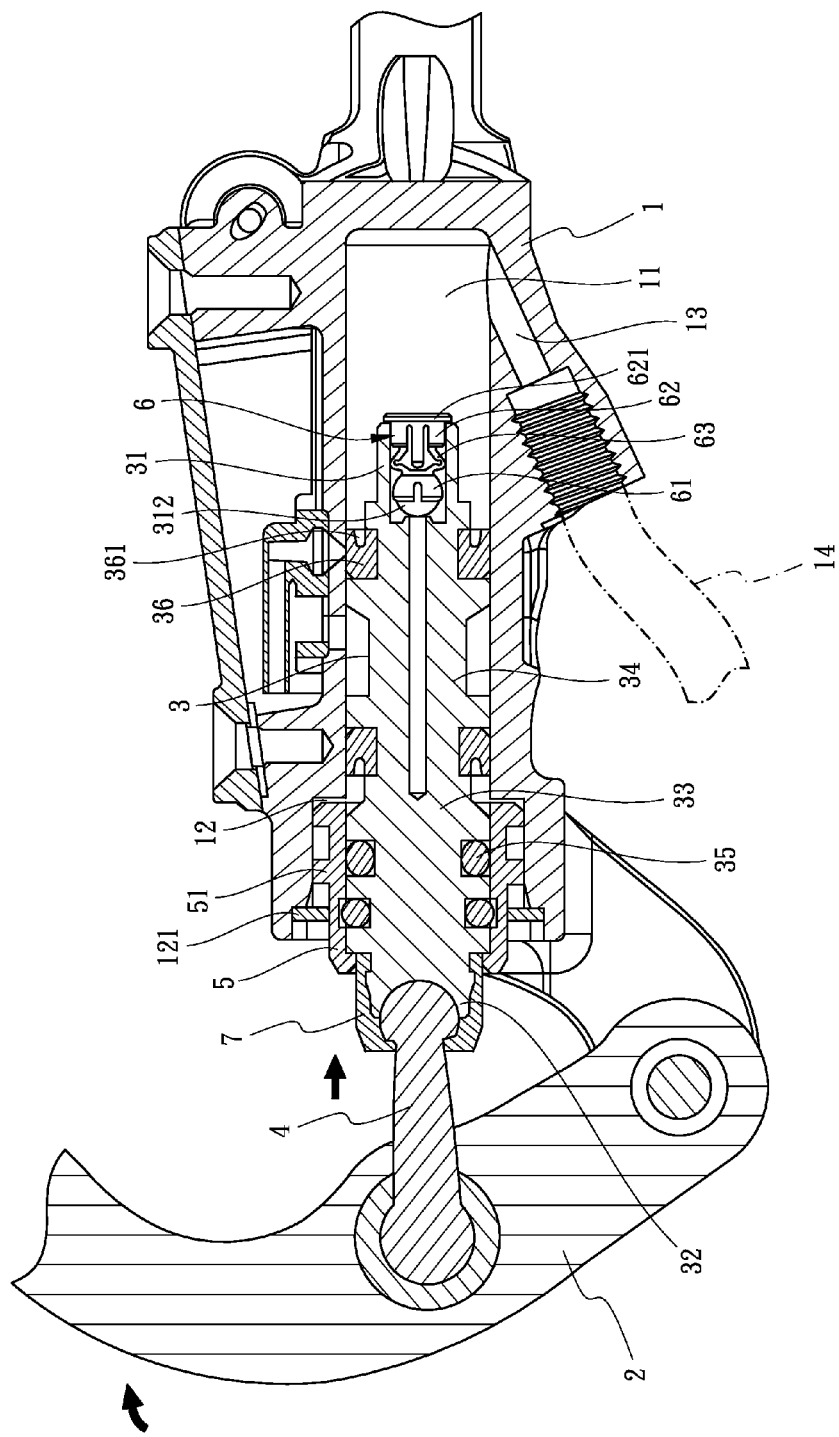
FIG. 5 is a schematic view for showing a brake lever of the hydraulic brake device is actuated.

Under this arrangement, as shown in FIGS. 1-2 and FIG. 5, when a user actuates the brake lever 2 to brake a bicycle, the brake lever 2 pushes the hydraulic rod 3 via the connecting rod 4 to move toward another end of the main body 1, so that the elastic member 6 presses a volume of hydraulic oil in the hydraulic room 11. When the pressure of the hydraulic oil exceeds a threshold pressure because the user brakes the bicycle suddenly and forcefully, said pressure pushes the driving portion 62 of the elastic member 6 so as to indirectly force the deformation portion 63 to deform and bend, so that the deformation portion 63 and the driving portion 62 slightly move toward the assembling portion 61; thereby, the hydraulic oil is smoothly pushed into the brake caliper through the hydraulic pipeline 14, where the deformation portion 63 deforms to stably and smoothly brake the bicycle; when the user releases the brake lever 2, the pressure of the hydraulic oil decreases so that the deformation portion 63 of the elastic member 6 recovers elastically and the driving portion 62 returns to its position. Undoubtedly, when the user actuates the brake lever 2 slowly and stably, the pressure of the hydraulic oil does not exceed the threshold pressure, so that said pressure does not push the driving portion 62 of the elastic member 6 and does not force the deformation portion 63 to deform and bend; as a result, the hydraulic oil is smoothly pushed into the brake caliper through the hydraulic pipeline 14, so that the user brakes the bicycle stably, smoothly and safely.

The present invention further comprises the following characteristics.

1. The operating head 31 has a recess 311 opened at one end thereof. The assembling portion 61 of the elastic member 6 is semispherical shaped and is assembled into the recess 311. A bead 312 is disposed between a surface of the recess 311 and the assembling portion 61. The deformation portion 63 of the elastic member 6 is arced. The driving portion 62 is hollow and is positioned within the recess 311. The driving portion 62 has a flange 621 annularly defined at a periphery of one end thereof. The flange 621 is defined beside an outer periphery of an opening of the recess 311. Therefore, when the pressure of the hydraulic oil exceeds the threshold pressure, the hydraulic oil pushes the driving portion 62 of the elastic member 6, so that the deformation portion 63 is forced to deform and bend so as to slightly move toward the assembling portion 61; moreover, the flange 621 of the driving portion 62 is abutted against the outer periphery of the opening of the recess 311, so the movement of the driving portion 62 is limited to prevent the driving portion 62 from being completely trapped in the recess 311, as a result, when the hydraulic oil pressure decreases, the driving portion 62 of the elastic member 6 resiles smoothly.

2. A first one of the at least elastic ring 36 is put on between the operating head 31 and the second sealing segment 34. A second one of the at least elastic ring 36 is put on between the first sealing segment 33 and the second sealing segment 34. The first one of the at least elastic ring 36 has one annular groove 361 opened thereon and corresponds to one end of the hydraulic room 11. The second one of the at least elastic ring 36 has another annular groove 361 opened thereon and corresponds to the assembling room 12. Therefore, when the hydraulic rod 3 moves in directions which is opposite to openings of one annular groove 361 and another annular groove 361, one elastic ring 36 and another elastic ring 36 are pushed via the wall of the hydraulic room 11 so as to deform and expand properly because of said annular grooves 361, so that the hydraulic oil does not leak out from the assembling room 12 and is sealed properly; as a result, an effective brake performance is achieved.

3. The present invention further comprises a cap 7 sleeving on a joint between the assembling head 32 and the connecting rod 4.

4. The sleeve member 5 has a rib 51 defined at a periphery thereof. The assembling room 12 has a limiting member 121 assembled thereon. The limiting member 121 abuts against the rib 51 so that the sleeve member 5 does not detach from the assembling room 12 outwardly.

Although the invention has been explained in relation to its preferred embodiment, it is to be understood that many other possible modifications and variations can be made without departing from the spirit and scope of the invention as hereinafter claimed.

What is claimed is:

1. A hydraulic brake device comprising:
a main body, a brake lever, a hydraulic rod, a connecting rod, a sleeve member and an elastic member;
the main body having a hydraulic room and an assembling room, where the assembling room adjoins the hydraulic room structurally, is disposed at one end of the main body and adjoins an outside structurally, at which the hydraulic rod is inserted in the main body;
one end of the brake lever pivotally assembled to the main body, the brake lever corresponding to the outside of the assembling room;
the hydraulic rod movably assembled in the hydraulic room and the assembling room, the hydraulic rod having an operating head, an assembling head, a first sealing segment and a second sealing segment, the operating head being positioned in the hydraulic room, the assembling head being positioned at the outside of the assembling room, one end of the first sealing segment connected to the assembling head, another end of the first sealing segment connected to one end of the second sealing segment, another end of the second sealing segment connected to the operating head, the first sealing segment being positioned in the assembling room and having at least one sealing ring sleeved thereon, the second sealing segment being positioned in the hydraulic room and having at least one elastic ring sleeved thereon, the elastic ring contacting a wall of the hydraulic room;

two ends of the connecting rod connecting to the brake lever and the assembling head of the hydraulic rod respectively;

the sleeve member slidably assembled in the assembling room and sleeving onto the first sealing segment, the sealing ring contacting an inner wall of the sleeve member; and the elastic member having an assembling portion, a driving portion and a deformation portion, the elastic member being defined on the operating head, the deformation portion connecting the assembling portion and the driving portion;

wherein when a user actuates the brake lever to brake a bicycle, the brake lever pushes the hydraulic rod via the connecting rod to move toward another end of the main body, so that the elastic member presses a volume of hydraulic oil into the hydraulic room; when the pressure of the hydraulic oil exceeds a threshold pressure, said pressure of the hydraulic oil pushes the driving portion of the elastic member so as to indirectly force the deformation portion to deform and bend, so that the deformation portion and the driving portion slightly move toward the assembling portion, where the deformation portion deforms to stably and smoothly brake the bicycle; when the user releases the brake lever, the pressure of the hydraulic oil decreases so that the deformation portion of the elastic member recovers elastically and the driving portion returns to its position.

2. The hydraulic brake device as claimed in claim 1, wherein the operating head has a recess opened at one end thereof; the assembling portion of the elastic member is semispherical shaped and is assembled into the recess; a bead is disposed between a surface of the recess and the assembling portion; the deformation portion of the elastic member is arced.

3. The hydraulic brake device as claimed in claim 2, wherein the driving portion is hollow and is positioned within the recess; the driving portion has a flange annularly defined at a periphery of one end thereof; the flange is defined beside an outer periphery of an opening of the recess.

4. The hydraulic brake device as claimed in claim 1, wherein a first one of the at least elastic ring is put on between the operating head and the second sealing segment; a second one of the at least elastic ring is put on between the first sealing segment and the second sealing segment.

5. The hydraulic brake device as claimed in claim 4, wherein the first one of the at least elastic ring has one annular groove opened thereon and corresponds to one end of the hydraulic room; the second one of the at least elastic ring has another annular groove opened thereon and corresponds to the assembling room.

6. The hydraulic brake device as claimed in claim 1, wherein a cap sleeves on a joint between the assembling head and the connecting rod.

7. The hydraulic brake device as claimed in claim 1, wherein the sleeve member has a rib defined at a periphery thereof; the assembling room has a limiting member assembled thereon; the limiting member abuts against the rib so that the sleeve member does not detach from the assembling room outwardly.

* * * * *